(12) United States Patent
Bi et al.

(10) Patent No.: US 9,828,009 B2
(45) Date of Patent: Nov. 28, 2017

(54) HAND BRAKE

(71) Applicant: CRRC QINGDAO SIFANG ROLLING STOCK RESEARCH, Qingdao (CN)

(72) Inventors: Jingquan Bi, Qingdao (CN); Chaoheng Wang, Qingdao (CN); Xiangrui Li, Qingdao (CN); Jigang Zhou, Qingdao (CN); Xin Zhang, Qingdao (CN); Chao Lin, Qingdao (CN)

(73) Assignee: CRRC QINGDAO SIFANG ROLLING STOCK RESEARCH INSTITUTE CO., LTD., Shandong (CN)

( * ) Notice: Subject to any disclaimer, the term of this patent is extended or adjusted under 35 U.S.C. 154(b) by 0 days.

(21) Appl. No.: 15/157,262

(22) Filed: May 17, 2016

(65) Prior Publication Data
US 2016/0257317 A1    Sep. 8, 2016

Related U.S. Application Data

(63) Continuation of application No. PCT/CN2015/074374, filed on Mar. 17, 2015.

(30) Foreign Application Priority Data

May 19, 2014   (CN) .......................... 2014 1 0209940

(51) Int. Cl.
*B61H 13/04* (2006.01)
*B60T 7/10* (2006.01)
*G05G 1/08* (2006.01)

(52) U.S. Cl.
CPC ................ *B61H 13/04* (2013.01); *B60T 7/10* (2013.01); *G05G 1/08* (2013.01)

(58) Field of Classification Search
CPC ........ B61H 13/04; B61H 13/02; B61H 13/20; Y10T 74/2048
(Continued)

(56) References Cited

U.S. PATENT DOCUMENTS 1,975,961 A * 10/1934 Lindeman .............. B61H 13/04
                                                          192/93 A
1,982,016 A * 11/1934 Olander .................. B61H 13/04
                                                              74/505
(Continued)

FOREIGN PATENT DOCUMENTS

CN         1356230 A      7/2002
CN       101746394 A      6/2010
(Continued)

OTHER PUBLICATIONS

International Search Report of corresponding International PCT Application No. PCT/CN2015/074374, dated Jun. 8, 2015.
(Continued)

*Primary Examiner* — Bradley King
*Assistant Examiner* — Stephen Bowes
(74) *Attorney, Agent, or Firm* — J.C. Patents

(57) ABSTRACT

Provided is a hand brake, comprising a hand wheel (4), a chain (5), an enclosure (1), a drive shaft assembly (3) which is disposed in the enclosure (1), bull gear (13), and base assembly; the hand wheel (4) is connected to the drive shaft assembly (3), one end of the chain (5) is fixed to the bull gear (13) by means of rivets, and the main shaft of the bull gear (13) is a chain winding shaft (2). The hand brake further comprises a limiting device disposed on the chain winding shaft (2) between the bull gear (13) and the base (22); the limiting device comprises a first bearing (10), a torsion spring (11), a guide plate (9), and a guide plate holder (23). Installing the hand brake not only prevents the problem of
(Continued)

the chain interfering with the movable pulley when the hand brake is deployed and thus affecting the performance of the hand brake, but also provides for a better appearance.

10 Claims, 8 Drawing Sheets

(58) Field of Classification Search
USPC .............. 74/575, 576, 577 R, 577 S, 577 SF, 74/577 M, 578
See application file for complete search history.

(56) References Cited

U.S. PATENT DOCUMENTS

| | | | | |
|---|---|---|---|---|
| 3,176,539 A | * | 4/1965 | Mersereau | ............. B61H 13/04 188/33 |
| 3,668,944 A | * | 6/1972 | Natschke | ............... B61H 13/04 74/505 |
| 3,803,940 A | | 4/1974 | La Belle | ......................... 74/505 |
| 4,182,197 A | * | 1/1980 | Olander | ................. B61H 13/04 74/411.5 |
| 4,291,793 A | * | 9/1981 | Klasing | .................. B61H 13/04 192/101 |
| 6,179,093 B1 | | 1/2001 | Daugherty, Jr. | ................. 188/33 |
| 2008/0296122 A1 | | 12/2008 | Michel | ........................ 192/13 R |
| 2016/0347335 A1 | * | 12/2016 | Bi | .......................... B61H 13/20 |

FOREIGN PATENT DOCUMENTS

| | | |
|---|---|---|
| CN | 103569153 A | 2/2014 |
| CN | 103963800 A | 8/2014 |
| CN | 203819263 U | 9/2014 |

OTHER PUBLICATIONS

Chinese First Examination Report of corresponding China Application No. 201410209940.1, dated Sep. 3, 2014.
Chinese First Examination Report of corresponding China Application No. 201410209940.1, dated Dec. 19, 2014.

* cited by examiner

HAND BRAKE

CROSS-REFERENCE TO RELATED APPLICATIONS

This application is a continuation of International application No. PCT/CN2015/074374 filed on Mar. 17, 2015, entitled HAND BRAKE, which claims the priority benefit of Chinese patent application No. 201410209940.1, filed on May 19, 2014. The entirety of the above-mentioned patent applications are hereby incorporated by reference herein and made a part of this specification.

FIELD OF THE INVENTION

The invention relates to the mechanical field, and in particular, to a hand brake.

BACKGROUND OF THE INVENTION

A hand brake is a mechanism installed on the vehicle braking device by means of man power as the motive power, and it is mainly used in railway wagons. When the railway wagon is commissioning or is parking, by manually operate the hand brake with man power as the motive power, to produce the braking force, and the braking force is transmitted to the brake shoe through basic braking device, then the brake shoe is close to the wheel to produce braking. The common hand brake usually comprises of a hand wheel, a chain, an enclosure, a drive shaft assembly disposed in the enclosure, bull gear and base, hand wheel and drive shaft assembly are connected, one end of the chain is fixed on the bull gear, and the other end is connected with the fixed pulley arranged at the bottom of the braked vehicle through a hand brake pull rod. When braking, a hand wheel drives a pinion to rotate clockwise by a drive shaft, and then drives the bull gear to rotate counterclockwise, and the ratchet and pawl rotate oppositely. When the bull gear rotates, the chain is wrapped around the bull gear spindle, thereby applying a braking force to the pull rod of the basic braking device. When the hand brake is working, the opinion is connected with the drive shaft through a clutch, at this time, rotate the hand wheel, and the drive shaft will rotate; when an operator releases the hand wheel, the ratchet has a tendency of reverse rotation due to the gravity of the chain, however, with blocking effect of the pawl, the ratchet will not rotate, nor drive the chain to move, so as to maintain the braking effect. When it is necessary to relieve, operate the clutch, to separate the pinion from the drive shaft. At this time, the chain moves under the gravity, and drive the pinion to rotate relative to the drive shaft by the bull gear, to achieve remission operation. However, this kind of hand brake has the following drawbacks: (1) when a convertible is coupled with a truck, usually there is interference of the hand brake hand wheel and the windshield; (2) The chain-hand brake pull rod and the wheel groove of the fixed pulley are not in a straight line, the design is unreasonable, which will not only affect the appearance, but also the transmission efficiency is low, easily leading to the wear of the fixed pulley and hand brake lever.

In order to solve the interferences of hand wheel of hand brake and the bus windshield, the prior hand brake needs to offset 125 mm or more to the outside of the vehicle horizontally, which will lead to form a lateral shift of about 100 mm between the chain center at the chain winding shaft end and the chain center at the fixed pulley end. Therefore, when 100 mm offset easily causes braking by the hand brake, the chain and enclosure are clamped, and the chain and movable pulley interfere, affecting the performance of the hand brake. Besides, the excessive offset may cause decreased transmission efficiency of fixed pulley, and the poor visual effect worsens. Through the structural analysis of the convertibles and hand brake, it is unable to guarantee the performance of the hand braking system of the truck only by adjusting the installation position of the hand brake on the vehicle to resolve the interference of the hand wheel of hand brake and the passenger windshield, and it is necessary to improve the structure of the NSW type hand brake.

SUMMARY OF THE INVENTION

In order to resolve the above problems of the hand brake, the present invention provides a hand brake with limiting device.

The invention adopts the following technical solutions: A hand brake comprises a hand wheel, a chain, an enclosure, a drive shaft assembly disposed in the enclosure, a bull gear and a base assembly. The hand wheel is connected with the drive shaft assembly, and one end of the chain is fixed to the bull gear through the rivet, and the main shaft of the bull gear is chain winding shaft. The other end of the chain is connected with the fixed pulley arranged at the bottom of the braking vehicle through a hand brake pull rod. The drive shaft assembly comprises a drive shaft, a pin wheel, a clutch, a ratchet, a pinion and an end part arranged sequentially. The hand wheel is disposed at the end close to the drive shaft and fixedly connected with the drive shaft; the bull gear is located at the end close to the pinion and engaged with the pinion. The end part of the hand brake is connected with the drive shaft by elastic cylindrical pins instead of welding method for NSW type hand brake, which can facilitate the overhaul of the drive shaft assembly.

The enclosure is provided with a function handle, a pawl, a pawl pin and a pawl holder, the function handle is fixedly connected with the pawl pin, and the pawl is restricted on the pawl pin rotatably through a pawl holder. Counterweight is disposed on the side of pawl pin away from the pawl. The pawl is clamped between adjacent gears of ratchet, so that the ratchet can rotate clockwise driven by the drive shaft, preventing the counterclockwise rotation of the ratchet.

The hand brake further comprises a limiting device disposed on the chain winding shaft between the bull gear and the base. The part in the base, where matches with the limiting device, is concavity, so as to hold the limiting device. The limiting device comprises a first bearing, a torsion spring, a guide plate, and a guide plate holder; the torsion spring is sleeved on the outside of the first bearing, the torsion spring holder is disposed at the side of the torsion spring where close to the bull gear, the guide plate and the guide plate holder are successively disposed at the side of the torsion spring where close to the base; a third stopper post is secured to the side of the torsion spring holder facing the torsion spring, a first stopper post is secured to the side of the guide plate facing the torsion spring; a second stopper post is secured to the side of the base facing the guide plate holder. The both ends of the torsion spring are curved hooks; the guide plate and the guide plate holder are annular structure. An arcuate groove is provided on the guide plate that can pass through the guide plate, and the width of the groove is not less than the diameter of the second stopper post and the arc length of the groove should be no greater than the three-fourth of perimeter. Holes matching with the second stopper post are arranged on the guide plate holder, and the second stopper post passes, by means of the hole, through the guide plate holder and rotates in the arcuate groove.

The material of the torsion spring is 65Mn; the number of turns of the torsion spring is N, $3 \leq N \leq 6$; and the wire diameter of the torsion spring is r, $4 \text{ mm} \leq r \leq 6$ mm. Two hook tips of the torsion spring pass through the same longitudinal axis, that is, the distance between the two hook ends is N full circles.

The end of the torsion spring close to the torsion spring holder is clamped with the third stopper post, the end of the torsion spring close to the guide plate is clamped with the first stopper post. Clamping means that the curved hooks at the end of the torsion spring are connected with the corresponding stopper post. The height of the third stopper post is $H_3$, the height of the second stopper post is $H_2$, and the height of the first stopper post is $H_1$; $r \leq H3 \leq (N-1)*r$, $r \leq H1 \leq (N-1)*r$, $H_2$ is greater than the thickness of the guide plate holder, no greater than the sum of the thickness of the guide plate and the guide plate holder. One end of the torsion spring is only clamped with the third stopper post, and the other end of the torsion spring is only clamped with the first stopper post, besides, the second stopper post is not clamped with the torsion spring.

Working Principle of this Invention:

(1) Braking function: pull the function handle at the "conventional" position, and rotate the hand wheel clockwise, to drive the pin wheel on the drive shaft to rotate, and transmit the torque to the pinion through the clutch, then the pinion drives the bull gear to rotate, to achieve the braking.

(2) Quick relief function: Under braking condition, rotate the hand wheel counterclockwise about 20~60° to drive the clutch to have axial movement. The clutch disconnects the transmission between the drive shaft and the pinion, to achieve quick relief function. The angle of counterclockwise rotation is only 20~60°, so the quick relief will not cause the rotation of the hand wheel.

(3) Force adjusting function: pull the function handle at the "force adjusting" position; at this time, the pawl inside the hand brake will not work, rotate the hand wheel clockwise to drive the pin wheel on the drive shaft to rotate, and transmit the torque to the pinion through the clutch, then the pinion drives the bull gear to rotate, to achieve the braking. According to the needs, the counterclockwise rotation of the hand wheel can reduce the braking force, and the clockwise rotation of the hand wheel can increase the braking force, to achieve the force adjusting function.

Before improvement, when the hand brake is at the full relief state under the action of gravity, the chain is at the position and state as shown in FIG. 10. After improvement, by setting a limiting device at the back of the bull gear, the chain is at the position and state as shown in FIG. 11 when the hand brake is at the full relief state. Under the full relief state, the chain of the hand brake has an offset to the right by 47 mm after improvement.

Braking process: The chain is located at the position as shown in FIG. 11 at the initial relief position. At this time, one end of the torsion spring is limited to the first stopper post, and the other end is limited to the third stopper post. The guide plate connected with the first stop post is limited to the second stopper post. When baking is applied, the hand wheel rotates clockwise to drive the pin wheel to rotate by the drive shaft, and thus drive the pinion to rotate clockwise through the clutch. The pinion is engaged with the bull gear, to drive the bull gear to rotate counterclockwise. Since the third stopper post is fixedly disposed on the bull gear, the third stopper post will rotate with the bull gear, at this time, the torsion spring does not move. When the bull gear rotates one circle, the tip of the torsion spring end is blocked by the third stopper post, at this time, the torsion spring rotates counterclockwise together with the bull gear driven by the third stopper post. When the bull gear continues to rotate one circle, the tip of the other end of torsion spring is blocked by the first stopper post, at this time, the bull gear rotates two circles (chain involvement is about 500 mm). Since the first stopper post is fixedly provided on the guide plate, with the continued rotation of the bull gear, the torsion spring will drive the guide plate 4 to rotate counterclockwise by driving the first stopper post. At this time, the second stopper post fixed on the base assembly moves relatively to the guide plate 4, and rotates clockwise in the groove of the guide plate 4. When the second stopper post rotates at most three-quarters circle in the groove of the guide plate 4 as shown in FIG. 7, the guide plate 4 is blocked by the second stopper post. At this time, when continuing rotation, the torsion spring will produce torque to hinder the braking.

As described above, when the hand brake brakes in the present invention, the limiting device can guarantee that the bull gear rotates two and three-quarters circles (amount of involvement up to 800 mm or more) and the torsion spring will not produce reverse hindrance. The maximum involvement of the commonly used hand brake is only 458 mm, thus, the design of the limiting structure can fully meet the normal braking requirements of the hand brake.

Relief process: Under braking condition, rotate the hand wheel counterclockwise about 20~60° to drive the clutch to have axial movement. The clutch disconnects the transmission between the drive shaft and the pinion, to achieve quick relief function. The angle of counterclockwise rotation is only 20~60°, so the quick relief will not cause the rotation of the hand wheel. The chain moves under the gravity, and drive the pinion to rotate relative to the drive shaft by the bull gear, to achieve remission operation. When relief, with the rotation of the bull gear clockwise, the third stopper post will rotate with the bull gear, at this time, the torsion spring does not move. When the bull gear rotates one circle, the tip of the torsion spring end is blocked by the third stopper post, at this time, the torsion spring rotates counterclockwise together with the bull gear, driven by the third stopper post. When the bull gear continues to rotate one circle, the tip of the other end of torsion spring is blocked by the first stopper post, at this time, the bull gear rotates two circles (release amount of the chain is about 500 mm). Since the first stopper post is fixedly provided on the guide plate, with the continued rotation of the bull gear, the torsion spring will drive the guide plate 4 to rotate clockwise by driving the first stopper post. At this time, the second stopper post fixed on the base assembly moves relatively to the guide plate 4, and rotates clockwise in the groove of the guide plate 4. When the second stopper post rotates to the end of the groove in the groove of the guide plate 4, the guide plate 4 is blocked by the second stopper post, to achieve the same level of the rivet secured to the chain and chain winding shaft, avoid the dropping of chain under the action of gravity, thus there is no lateral offset between the chain center and the center of the chain winding shaft.

The invention can achieve the following beneficial effects:

(1) The center distance between the drive shaft and chain which is on end of the chain winding shaft is increased by 47 mm; after installing the hand brake, the lateral offset between the chain center of chain winding shaft end and the chain center of fixed pulley is reduced to 53 mm provided that the hand brake does not interfere with the windshield of passenger vehicle, which can not only prevents the problem of the chain interfering with the fixed pulley when the hand brake is deployed and thus affecting the performance of the hand brake, but also provides for a better appearance.

(2) The end part of the hand brake is connected with the drive shaft by elastic cylindrical pins; compared with the welding method for prior hand brakes, it can facilitate the overhaul of the drive shaft assembly.

(3) The improved hand brake can guarantee the performance of the hand braking system of the truck after adjusting the position of the mounting location (to avoid interference with the windshield), and the ratio of the improved hand brake is consistent with that before improvement.

Figure 1:
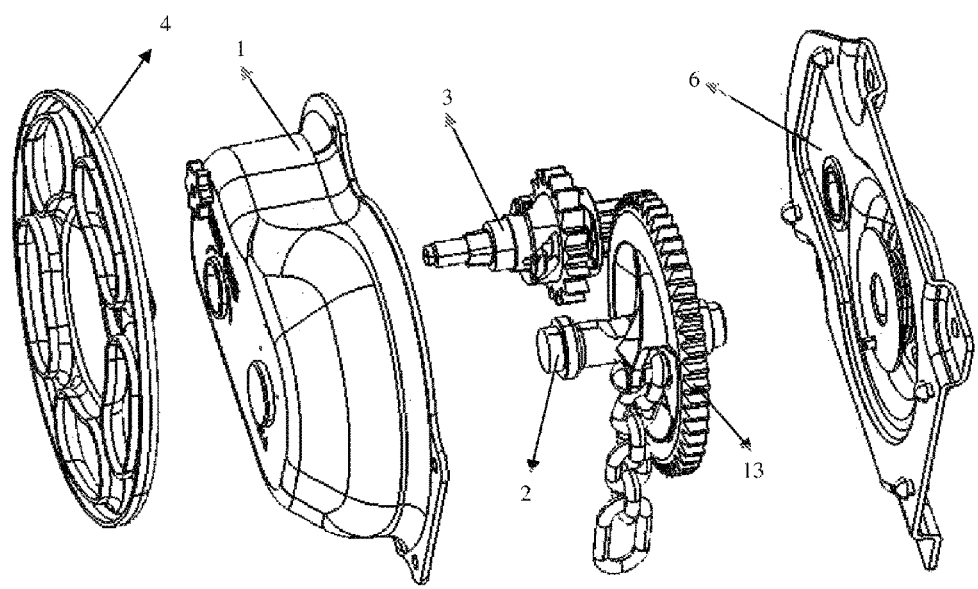
FIG. 1 is a first schematic diagram of a hand brake in the present invention.
Figure 2:
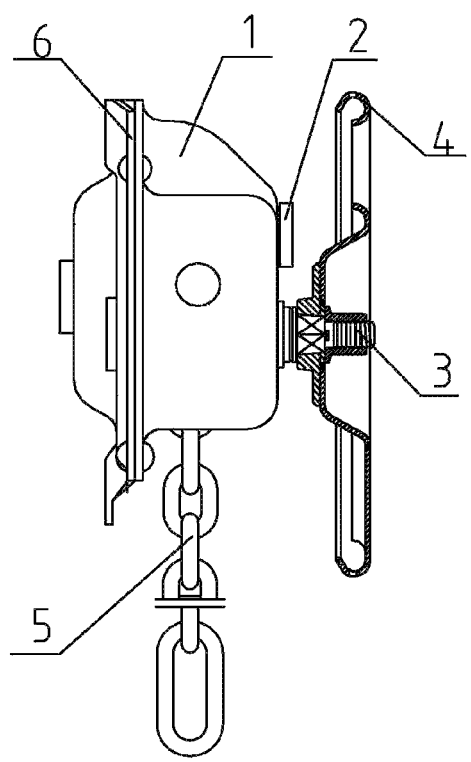
FIG. 2 is a second schematic diagram of a hand brake in the present invention.
Figure 3:
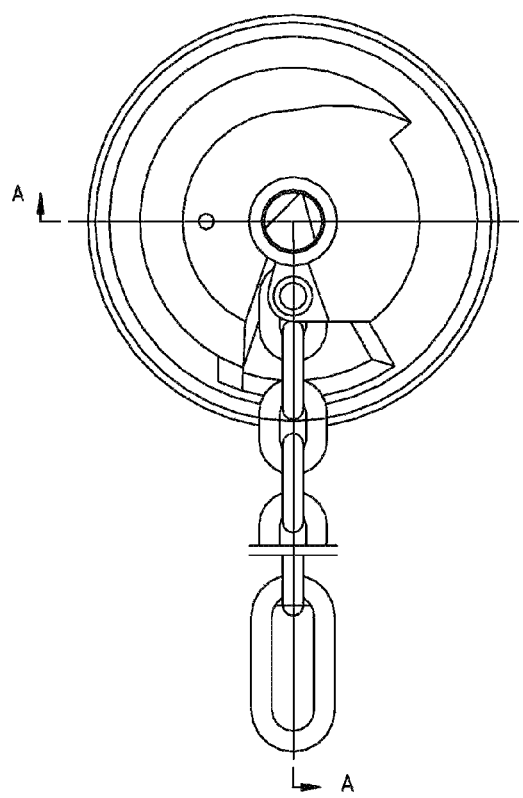
FIG. 3 is a first schematic diagram of limiting device of a hand brake in the present invention.
Figure 4:
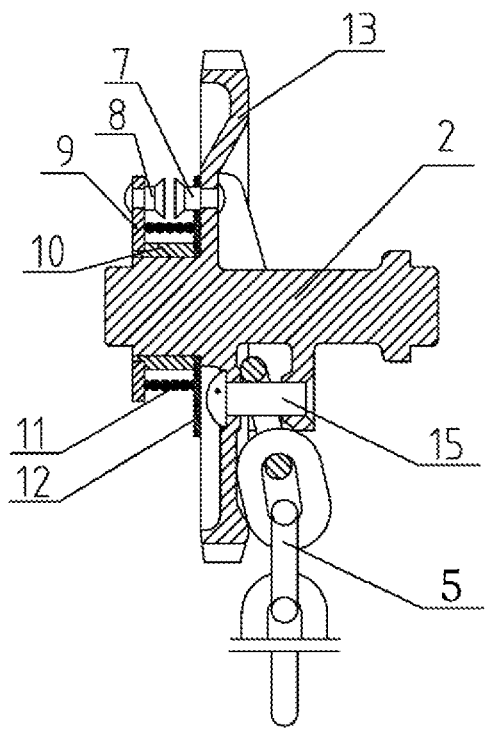
FIG. 4 is an A-A sectional view of FIG. 3.
Figure 5:
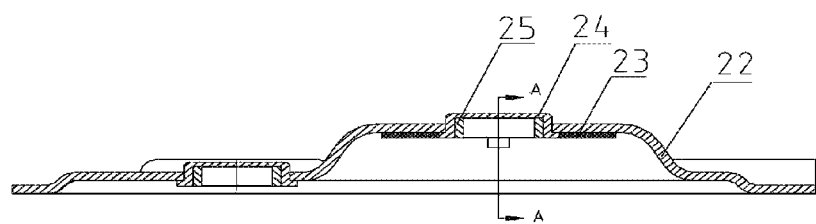
FIG. 5 is a first schematic diagram of base assembly of a hand brake in the present invention.
Figure 6:
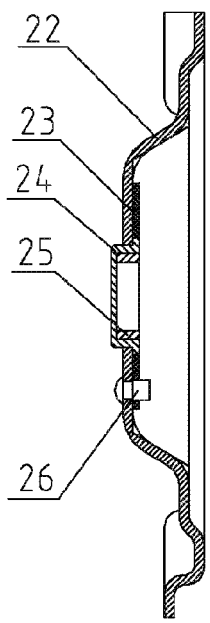
FIG. 6 is an A-A sectional view of FIG. 5.
Figure 7:
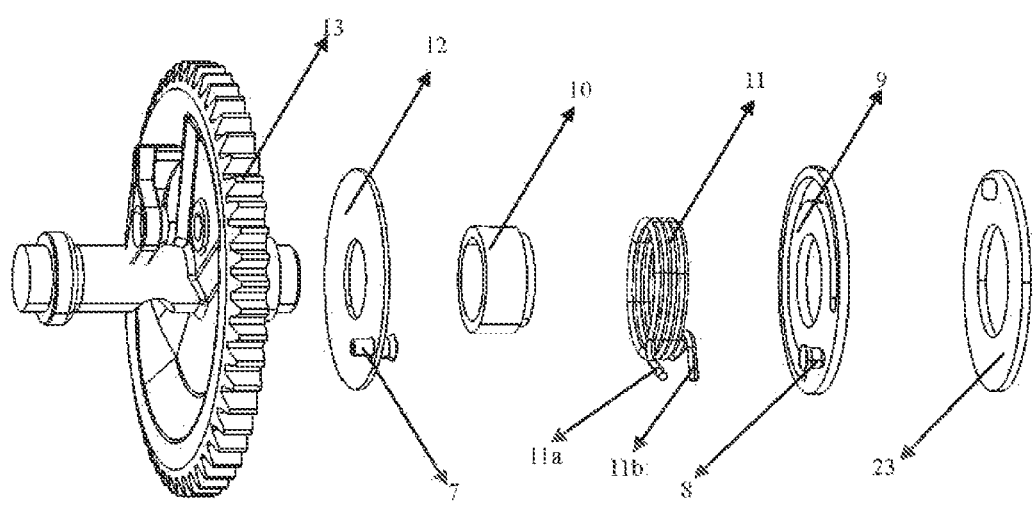
FIG. 7 is a second schematic diagram of base assembly of a hand brake in the present invention.
Figure 8:
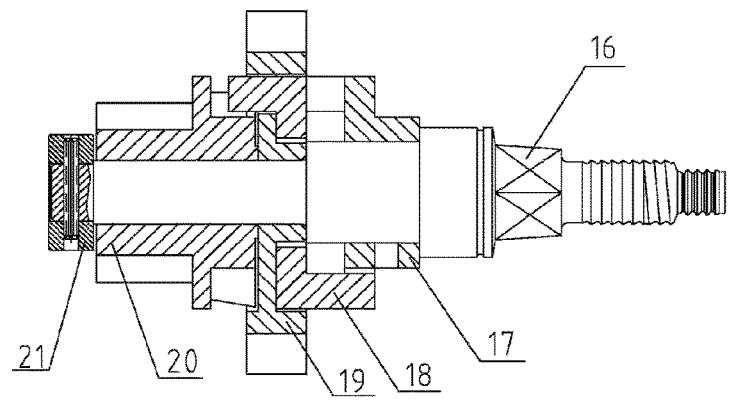
FIG. 8 is a first schematic diagram of drive shaft assembly of a hand brake in the present invention.
Figure 9:
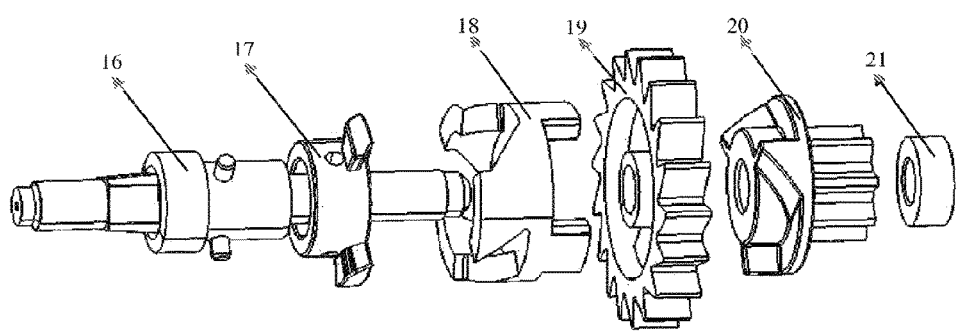
FIG. 9 is a second schematic diagram of drive shaft assembly of a hand brake in the present invention.
Figure 10:
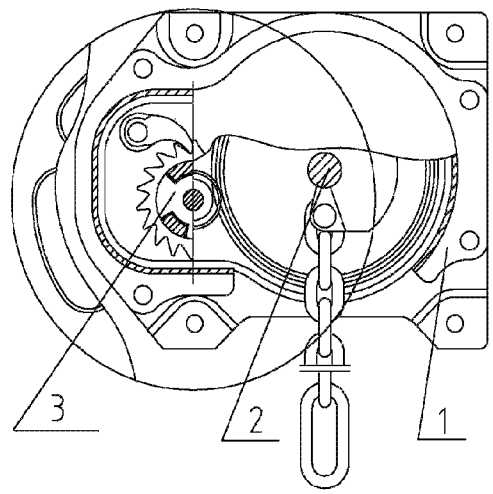
FIG. 10 is a schematic diagram of chain state of the prior hand brake under the relief state.
Figure 11:
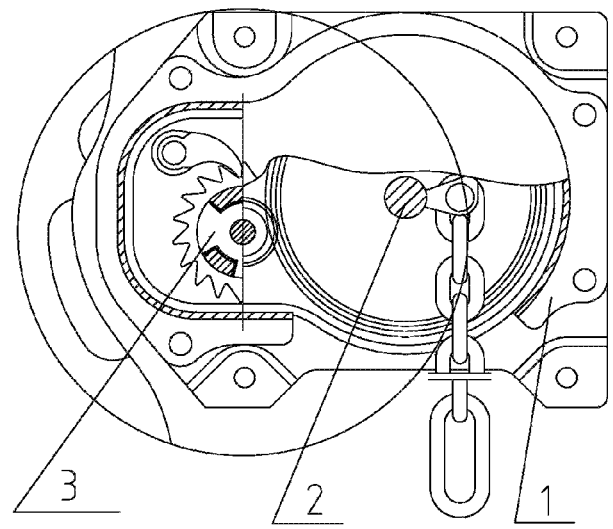
FIG. 11 is a schematic diagram of chain state of a hand brake under the relief state in the present invention.
Figure 12:
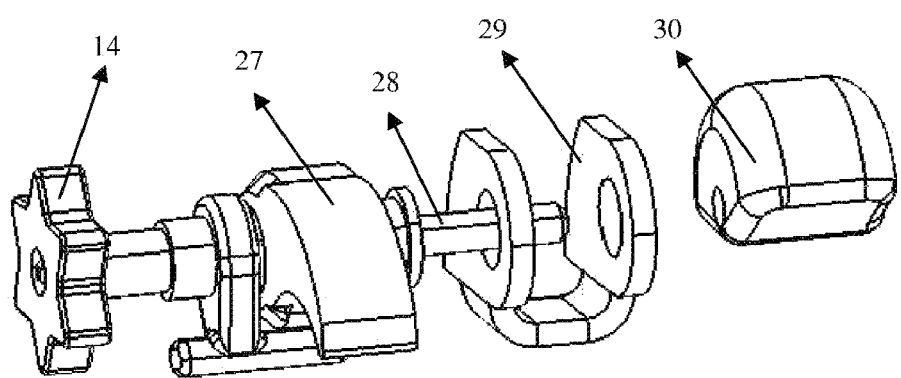
FIG. 12 is an exploded view of the handle of a hand brake in the present invention.

Of which, 1 enclosure, 2 chain winding shaft, 3 drive shaft assembly, 4 hand wheel, 5 chain, 6 base assembly, 7 third stopper post, 8 second stopper post, 9 guide plate, 10 first bearing, 11 torsion spring, 12 torsion spring holder, 13 bull gear, 14 handle, 15 rivet, 16 drive shaft, 17 pin wheel, 18 clutch, 19 ratchet, 20 pinion, 21 end part, 22 base, 23 guide plate holder, 24 bearing holder, 25 second bearing, 26 second stopper post, 27 pawl, 28 pawl pin, 29 pawl holder, 30 counterweight.

DETAILED DESCRIPTION OF THE EMBODIMENTS

The invention is further described in combination with drawings and embodiments.

Example 1

A hand brake, comprising a hand wheel 4, a chain 5, an enclosure 1, a drive shaft assembly 3 which is disposed in the enclosure 1, a bull gear 13, and a base assembly 6; the hand wheel 4 is connected to the drive shaft assembly 3, one end of the chain 5 is fixed to the bull gear 13 by means of rivets, and the main shaft of the bull gear 13 is a chain winding shaft 2. The drive shaft assembly 3 comprises a drive shaft 16, a pin wheel 17, a clutch 18, a ratchet 19, a pinion 20 and an end part 21 arranged successively; the hand wheel 4 is disposed at the end close to the drive shaft 16 and secured to the drive shaft 16, and the bull gear 13 is located at the end close to the pinion 20 and engaged with the pinion 20. The end part 21 of the hand brake is connected with the drive shaft 16 by elastic cylindrical pins, which can facilitate the overhaul of the drive shaft assembly.

The enclosure 1 is provided with a function handle 14, a pawl 27, a pawl pin 28 and a pawl holder 29, the function handle 14 is fixedly connected with the pawl pin 28, and the pawl 27 is restricted on the pawl pin 28 rotatably, through a pawl holder 29. A counterweight 30 is disposed on the side of pawl pin 28 away from the pawl 27. The pawl 27 is clamped between adjacent gears of ratchet 19, so that the ratchet 19 can rotate clockwise driven by the drive shaft 16, preventing the counterclockwise rotation of the ratchet 19.

The hand brake further comprises a limiting device disposed on the chain winding shaft 2 between the bull gear 13 and the base 22. The limiting device comprises a first bearing 10, a torsion spring 11, a guide plate 9 and a guide plate holder 23. The torsion spring 11 is sleeved on the outside of the first bearing 10, the torsion spring holder 12 is disposed at the side of the torsion spring 11 where close to the bull gear 13, and the guide plate 9 and the guide plate holder 23 are successively disposed at the side of the torsion spring 11 where close to the base 22. A third stopper post 7 is secured on the side of the spring holder 12 facing the torsion spring 11, a first stopper post 8 is secured on the side of the guide plate 9 facing the torsion spring 11, and a second stopper post 26 is secured on the base 22 facing the guide plate holder 23. Curved hooks are provided at both ends of the torsion spring 11, and the guide plate 9 and the guide plate holder 23 are annular structures. The guide plate 9 is provided with an arcuate groove that penetrates the guide plate 9, and the width of the groove is not less than the diameter of the second stopper post 26, and the arc length of the groove is not more than three-quarters of the circumference. Holes matching with the second stopper post 26 are arranged on the guide plate holder 23, and the second stopper post 26, by means of a hole, penetrates the guide plate holder 23 and rotates in the arcuate groove. The base 23 is further provided with second bearing 25, which is disposed on the base 23 through the bearing block 24. Outside of the bearing block 24 is the guide plate holder 23. The guide plate holder is 4 mm in thickness and the guide plate is 6 mm in thickness.

The torsion spring 11 is made of 65Mn; the number of turns of the torsion spring 11 is 4; the wire diameter of the torsion spring 11 is 5 mm. The end 11a of the torsion spring 11 close to the spring holder 23 is clamped with the third stopper post 7, and the end 11b of the torsion spring 11 close to the guide plate 9 is clamped with the first stopper post 8. The height $H_3$ of the third stopper post 7 is 5 mm, the height $H_2$ of the second stopper post 26 is 9 mm and height $H_1$ of the first stopper post 8 is 5 mm.

Since the bull gear of the hand brake after improvement adopts a limiting structure, under the natural state, there is a lateral distance of 47 mm between the center of chain and the center of chain winding shaft. The prior hand brake lacks of the limiting device, and the chain naturally drops under the action of gravity, thus there is no lateral offset between the chain center and the center of the chain winding shaft.

The improved hand brake can guarantee the performance of the hand braking system of the truck after adjusting the position of the mounting location (to avoid interference with the windshield), and the multiplying power of the improved hand brake is consistent with that before improvement. The distance between the drive shaft of the hand brake and the central line of the chain at the end of chain winding shaft is 40 mm greater than that before improvement.

TABLE 1

Comparison of technical parameters between the present invention and prior hand brake

| No. | Technical Parameters | The present invention | Prior hand brake |
|---|---|---|---|
| 1 | Diameter of hand wheel D/mm | 400 | 400 |
| 2 | Braking ratio γ | 27 | 27 |
| 3 | Involvement amount of chain L/mm | ≤458 | ≤458 |
| 4 | Input torque/N · m | 156 | 156 |
| 5 | Minimum output chain tension/kN | ≥10 | ≥10 |
| 6 | Machine maximum width/mm | 524 | 524 |
| 7 | Machine maximum height/mm | 400 | 400 |
| 8 | Machine maximum thickness/mm | 270 | 236 |
| 9 | Shape and size of mounting hole/mm | Lateral 286, vertical 305 | Lateral 286, vertical 305 |
| 10 | Weight/kg | 37 | 34 |

Example 2

The difference from Example 1 is as follows: The number of turns of the torsion spring 11 is 3; the wire diameter of the torsion spring 11 is 6 mm. The height $H_3$ of the third stopper post 7 is 10 mm, the height $H_2$ of the second stopper post 26 is 7 mm and the height $H_1$ of the first stopper post 8 is 6 mm.

Example 3

The difference from Example 1 is as follows: The number of turns of the torsion spring 11 is 5; the wire diameter of the torsion spring 11 is 4 mm. The height $H_3$ of the third stopper post 7 is 6 mm, the height $H_2$ of the second stopper post 26 is 10 mm and the height $H_1$ of the first stopper post 8 is 14 mm.

Example 4

Different from Example 1, there are six turns of the torsion spring 11, and the wire diameter of the torsion spring 11 is 4 mm. The height $H_3$ of the third stopper post 7 is 8 mm, the height $H_2$ of the second stopper post 26 is 8 mm, and the height $H_1$ of the first stopper post 8 is 8 mm.

The invention claimed is:

1. A hand brake, comprising a hand wheel (4), a chain (5), an enclosure (1), a drive shaft assembly (3) which is disposed in the enclosure (1), a bull gear (13), and a base assembly (6); wherein the hand wheel (4) is connected to the drive shaft assembly (3), one end of the chain (5) is fixed to the bull gear (13), and a main shaft of the bull gear (13) is a chain winding shaft (2), the base assembly (6) comprises a base (22); wherein the hand brake further comprises a limiting device disposed on the chain winding shaft (2) between the bull gear (13) and the base (22); the limiting device comprises a first bearing (10), a torsion spring holder (12), a torsion spring (11), a guide plate (9), and a guide plate holder (23); the torsion spring (11) is sleeved on outside of the first bearing (10), the torsion spring holder (12) is disposed at a first side of the torsion spring (11) close to the bull gear (13); the guide plate (9) and the guide plate holder (23) are successively disposed at a second side of the torsion spring (11) close to the base (22); a first stopper post (8) is secured to a side of the guide plate (9) facing the torsion spring (11); a second stopper post (26) is secured to a side of the base (22) facing the guide plate holder (23); a third stopper post (7) is secured to a side of the torsion spring holder (12) facing the torsion spring (11); both ends of the torsion spring (11) are curved hooks, the guide plate (9) and the guide plate holder (23) are of an annular structure; an arcuate groove is provided on the guide plate (9) that passes through the guide plate (9), and a hole matching with the second stopper post (26) in size is arranged on the guide plate holder (23), and the second stopper post (26) passes through the guide plate holder (23) via the hole and slides in the arcuate groove.

2. The hand brake according to claim 1, wherein the number of turns of the torsion spring (11) is N, 3≤N≤6; and a wire diameter of the torsion spring (11) is r, 4 mm≤r≤6 mm.

3. The hand brake according to claim 2, wherein a height of the third stopper post (7) is $H_3$, a height of the second stopper post (26) is $H_2$, and a height of the first stopper post (8) is $H_1$, r≤H3≤(N−1)*r, r≤H1≤(N−1)*r, $H_2$ is greater than a thickness of the guide plate holder (23), no greater than the sum of a thickness of the guide plate (9) and the guide plate holder (23).

4. The hand brake according to claim 2, wherein a first end (11*a*) of the torsion spring (11) close to the torsion spring holder (23) is clamped with the third stopper post (7), a second end (11*b*) of the torsion spring (11) close to the guide plate (9) is clamped with the first stopper post (8).

5. The hand brake according to claim 4, wherein a height of the third stopper post (7) is $H_3$, a height of the second stopper post (26) is $H_2$, and a height of the first stopper post (8) is $H_1$, r≤H3≤(N−1) r, r≤H1≤(N−1)*r, $H_2$ is greater than a thickness of the guide plate holder (23), no greater than the sum of a thickness of the guide plate (9) and the guide plate holder (23).

6. The hand brake according to claim 1, wherein a first end (11*a*) of the torsion spring (11) close to the torsion spring holder (23) is clamped with the third stopper post (7), a second end (11*b*) of the torsion spring (11) close to the guide plate (9) is clamped with the first stopper post (8).

7. The hand brake according to claim 1, wherein a width of the groove is not less than a diameter of the second stopper post (26), an arc length of the groove is not greater than 75% of a circumference of a circular arc which the groove belongs to.

8. The hand brake according to claim 1, wherein the drive shaft assembly (3) comprises a drive shaft (16), a pin wheel (17), a clutch (18), a ratchet (19), a pinion (20) and an end part (21) arranged successively; the hand wheel (4) is disposed at a first end close to the drive shaft (16) and secured to the drive shaft (16), and the bull gear (13) is located at end close to the pinion (20) and engaged with the pinion (20).

9. The hand brake according to claim 8, wherein the end part (21) is connected with the drive shaft (16) by an elastic cylindrical pin.

10. The hand brake according to claim 1, wherein the enclosure (1) is provided with a function handle (14), a pawl (27), a pawl pin (28) and a pawl holder (29), the function handle (14) is fixedly connected with the pawl pin (28), and the pawl (27) is restricted on the pawl pin (28) rotatably through the pawl holder (29).

* * * * *